United States Patent [19]

Lapidus

[11] E Re. 29,501

[45] Reissued Dec. 27, 1977

[54] DEODORIZER SHEET MATERIAL AND INSOLE

[75] Inventor: Herbert Lapidus, Ridgefield, Conn.

[73] Assignee: Combe Incorporated, White Plains, N.Y.

[21] Appl. No.: 734,185

[22] Filed: Oct. 20, 1976

Related U.S. Patent Documents

Reissue of:

[64] Patent No.: 3,842,519
Issued: Oct. 22, 1974
Appl. No.: 326,757
Filed: Jan. 26, 1973

[51] Int. Cl.[2] ..... A43B 13/38
[52] U.S. Cl. ..... 36/44; 428/306
[58] Field of Search ..... 36/43, 44; 428/306, 428/311; 260/2.5 AK

[56] References Cited

U.S. PATENT DOCUMENTS

| | | | |
|---|---|---|---|
| 2,748,502 | 6/1956 | Scholl | 36/44 |
| 3,143,812 | 8/1964 | Bittner | 36/44 |
| 3,640,920 | 2/1972 | Cear | 260/2.5 AK |
| 3,735,511 | 5/1973 | Gilbert et al. | 36/44 |
| 3,852,897 | 12/1974 | Bridge et al. | 36/44 |

FOREIGN PATENT DOCUMENTS

| | | | |
|---|---|---|---|
| 1,937,373 | 1/1970 | Germany | 36/43 |
| 168,725 | 9/1921 | United Kingdom | 36/44 |
| 728,075 | 4/1965 | United Kingdom | 36/44 |
| 1,270,809 | 4/1972 | United Kingdom | 36/44 |

*Primary Examiner*—Alfred R. Guest
*Attorney, Agent, or Firm*—Bryan & Bollo

[57] ABSTRACT

*A deodorizing latcx sheet material, insoles for use in reducing foot odor, and methods of making these products.* Shoe inserts are produced comprising a sole-shaped sheet or the like of foamed latex impregnated with activated charcoal. When such a shaped sheet is used as a shoe insert or insole it is found to substantially reduce or even eliminate foot odors frequently associated with perspiring feet.

43 Claims, No Drawings

DEODORIZER SHEET MATERIAL AND INSOLE

Matter enclosed in heavy brackets [ ] appears in the original patent but forms no part of this reissue specification; matter printed in italics indicates the additions made by reissue.

BACKGROUND OF THE INVENTION

Activated charcoal has long been used as a filter aid with both liquids and gases for the purpose of clarifying liquids and deodorizing liquids and gases.

In recent times it has been proposed as for example in British Specification No. 1,270,809 to incorporate activated charcoal into a fibre web or mat, the web or mat being supported by a backing material such as cloth obtained from natural sources as cotton, or formed of a synthetic such as nylon, and shaped so that the resulting web fits into and covers the inner sole of a shoe. It has also been proposed to attach a layer or coating of a foam material such as polyurethane foam to such a web for the purpose of providing increased strength and springiness.

SUMMARY OF THE INVENTION

My invention is directed to a unique shoe insert, or insole, which effectively and economically minimizes odors which are often associated with feet and which occur in conjunction with or as a result of perspiration. In general, my shoe insert comprises a foamed material, conveniently in the form of a sheet which has been cut or otherwise shaped to conform to the basic outline of a foot, and is adapted for insertion into a shoe. The shoe insert formed by incorporating activated charcoal into a chemical mix used to produce an open-celled foam through whose interstitial spaces air can pass.

After incorporation of the charcoal into a latex-containing chemical mix, the material is homogenized and spread uniformly into a web of cloth or the like, and then passed under a doctor blade to produce a desired thickness. The resulting product is then heat processed in order to produce a latex foam which is bonded to the web.

The resulting latex-foam sheets, containing charcoal dispersed therethrough, are then cut into such sizes as are appropriate for fitting comfortably into shoes, male or female. In use the insole is inserted into the shoe with the impregnated latex facing downward in the shoe to thereby permit contact of the web or backing material with the foot, and with the sock covering it.

The especially excellent effectiveness of my shoe insert seems to result from the circulation of air and vapors through and around the highly absorbable carbon particles, which occurs when the shoe containing such insert is worn.

DESCRIPTION OF THE PREFERRED EMBODIMENT

So that my invention may be fully understood I shall hereinafter describe a specific example illustrating the practice of my invention. This illustration is for that purpose only, and is not intended to either limit the scope of the invention or of the claims appended hereto.

EXAMPLE I

| Ingredients | Dry Weight |
|---|---|
| GR-S Latex | 100.0 lbs. |
| Sulfur | 1.5 lbs. |
| Zinc Oxide | 4.0–5.0 lbs. |
| Surfactant | 9.0 lbs. |
| Filler | 100.0 lbs. |
| Activated Charcoal | 25.0–32.0 lbs. |
| Antioxidant | 1.2 lbs. |
| Accelerator | 2.5 lbs. |

*Where "percent" is taken as the amount of a given component over the weight of the chemical mix producing the foam (dry basis), multiplied by 100, activated charcoal is present in the above compositions in the amount of about 10.2 (10.22) to about 12.8 (12.78) percent.*

The GR-S latex, a synthetic cold-type styrene-[butodiene]*butadiene* manufactured by the Goodyear Company of Akron, Ohio, is used in the form of an aqueous slurry (143.0 lbs.). And the activated charcoal, available under the tradename Nu-Char, is also used in the form of an aqueous slurry (150.0 lbs.).

The procedure used is as follows: The latex slurry is weighed out into a suitable mixing vessel and there is then added 9.0 lbs. of the surfactant, dioctyl-sodium-sulfo-succinate, available from the American Cyanamid Company of New York, under the trade name of Aerosol OT. There is then added 2.5 lbs. of [potassium persulfate as the] *a suitable* accelerator, *such as 1.25 lbs. each Zetax (a zinc salt of mercapto benzothiazole) and Ethyl Zimate (zinc diethyldithiocarbamate),* followed by additions of 1.5 lbs. of rubber makers grade sulfur, 4.0 to 5.0 lbs. of zinc oxide (American Process) and 1.2 lbs. of [dioctyl] *trioctyl* phosphite antioxidant.

Silica flour filler (100.0 lbs.) is then added, followed by addition of the activated charcoal aqueous slurry ([143] *25–32* lbs. of which is Nu-Char).

If it is desired to increase the viscosity of the foregoing mix, a suitable thickener, e.g., Methocel may be added.

The above components are then mixed to form a homogeneous mass, [and] *which* is then fed into a hopper, thence into a homogenizer, preferably an [Oaks] *Oakes* mixer, which is a rotor stator type homogenizer. [Preferable] *Preferably* two mixers are used in series. At the first mixer (called a prefrother) air is injected to control the pour density of the product. The base weight of the finished product is controlled by regulation of this air.

The material is then pumped into the second mixer, also a homogenizer, where the froth is refined, controlling the cell structure size.

After the mix leaves the second mixer and onto a flat surface (belt or table) covered with a layer of fabric which serves as a backing for the finished insert the thickness of the flow is controlled by a doctor blade set to give a finished foam guage of 80/1000 inch.

Instead of applying the mix onto a flat surface covered with a layer of fabric, as described above, the latex mix may be applied to a transfer paper instead. In other words, my sheet material can be produced with or without a fabric laminate.

Cup weights are taken after the mix leaves the second mixer; cup weights between 85 and 90 grams are acceptable, 87 grams being preferred. The tare weight (cup) is 24 grams.

The resulting material is then cured and dried in a forced hot air oven at temperatures ranging from 310° F to 350° F, with approximately 3 minutes of dwell time.

*When a sheet material according to the invention is made by the general method described herein, there inherently results a product with at least one side of the sheet having a relatively smooth skin formed during curing which is impervious to passage of charcoal particles.*

It will be understood, of course, by those skilled in the art that variations in the exact amounts and precise kinds of ingredients used in producing my charcoal-loaded latex foam are possible. Thus the levels of finely ground activated charcoal used may be varied rather widely, for example 35 percent or higher, by weight of the chemical mix producing the latex foam (dry basis) may be used, limited of course by the difficulty of incorporation into the latex mix, economic considerations, appearance and the like.

And though one specific latex foam formulation has been set forth in the foregoing example, those persons skilled in the art will understood that other foam formulations may be used, preferably those which can be processed to form an open-celled foam which breathes and allows for the passage of air through its interstitial spaces.

While it is presently preferred that the open-celled foam in sheet form comprising my invention be produced using latex, it is also contemplated, and is within the broad concept of my invention, that other open-celled foams may be used, such as polyurethane foams and vinyl chloride plastisol foams, especially where a slightly more [rigid] *firm* product is desired.

I claim:

1. A shoe insert for absorbing odors resulting from perspiring feet comprising a cured sheet of [open-celled] *open-celled* foam, at least one side of the sheet having a relatively smooth skin formed during curing which is impervious to passage of charcoal particles, said foam containing homogeneously distributed through the solid part thereof finely divided activated charcoal particles in an amount effective to absorb odors when said sheet is subjected to contact with foot perspiration and to passage of odor-filled air through interstitial spaces within said foam, said charcoal particles having been incorporated prior to frothing and curing of said foam.

2. The article of claim 1 wherein the charcoal is present in the amount of about 10.2 to 35 percent.

3. The article of claim 1 wherein the other side has a backing layer of a material which is pervious to passage of air, at least the outer surface of said layer being free of finely divided activated charcoal.

4. The product of claim 1 wherein said foam is formed of latex.

5. The product of claim [2] *3* wherein said material is a textile.

6. The product of claim 1 wherein said foam is selected from the group consisting of latex foams, polyurethane foams, and vinyl chloride plastisol foams.

*7. An effective deodorizer sheet material, said sheet material having interstitial spaces therein allowing for the passage of air therethrough, said sheet material comprising:*

*a. an open-celled latex foam through the open cells of which air can pass; and*

*b. finely ground activated charcoal for deodorizing, said charcoal being homogeneously dispersed throughout the latex material comprising said foam.*

*8. A deodorizer sheet material according to claim 7, wherein said finely ground activated charcoal is present in an amount up to about* 35 percent.

*9. A deodorizer sheet material according to claim 7, wherein said sheet material comprises a backing material.*

*10. A deodorizer sheet material according to claim 9, wherein said backing material is impregnated with said sheet material.*

*11. An effective deodorizer sheet material, said sheet material having interstitial spaces therein allowing for the passage of air therethrough, said sheet material comprising:*

*a. an open-celled latex foam through the open cells of which air can pass; and*

*b. at least about 10.2 percent finely ground activated charcoal for deodorizing, said charcoal being homogeneously dispersed throughout the latex material comprising said foam.*

*12. A deodorizer sheet material according to claim 11, wherein said sheet material comprises a backing material.*

*13. A deodorizer sheet material according to claim 12, wherein said backing material is impregnated with said sheet material.*

*14. An effective deodorizer sheet material, said sheet material having interstitial spaces therein allowing for the passage of air therethrough, said sheet material comprising:*

*a. an open-celled latex foam through the open cells of which air can pass; and*

*b. from at least about 10.2 percent to about 35 percent finely ground activated charcoal for deodorizing, said charcoal being homogeneously dispersed throughout the latex material comprising said foam.*

*15. A deodorizer sheet material according to claim 14, wherein said backing material is impregnated with said sheet material.*

*16. An effective deodorizer sheet material, said sheet material having interstitial spaces therein allowing for the passage of air therethrough, said sheet material comprising:*

*a. an open-celled latex foam through the open cells of which air can pass;*

*b. from at least about 10.2 percent to about 35 percent finely ground activated charcoal for deodorizing, said charcoal being homogeneously dispersed throughout the latex material comprising said foam; and*

*c. a backing material.*

*17. An effective foot-deodorizing insole, said insole being shaped to conform to the basic outline of a foot, adapted for insertion into a shoe and having interstitial spaces therein allowing for the passage of air therethrough, said insole comprising:*

*a. an open-celled foam through the open cells of which air can pass; and*

*b. finely ground activated charcoal for deodorizing, said charcoal being homogeneously dispersed throughout the material comprising said foam.*

*18. An insole according to claim 17, wherein said foam comprises latex.*

*19. An insole according to claim 17, wherein said foam comprises polyurethane.*

*20. An insole according to claim 17, wherein said foam comprises vinyl chloride.*

*21. An insole according to claim 17, wherein said finely ground activated charcoal is present in an amount up to about 35 percent.*

*22. An insole according to claim 17, wherein said insole comprises a backing material.*

*23. An insole according to claim 22, wherein said backing material is impregnated with said foam.*

*24. An effective foot-deodorizing insole, said insole being shaped to conform to the basic outline of a foot, adapted for insertion into a shoe and having interstitial spaces therein allowing for the passage of air therethrough, said insole comprising:*

*a. an open-celled foam through the open cells of which air can pass; and*

*b. at least about 10.2 percent finely ground activated charcoal for deodorizing, said charcoal being homogeneously dispersed throughout the material comprising said foam.*

*25. An insole according to claim 24, wherein said foam comprises latex.*

*26. An insole according to claim 24, wherein said foam comprises polyurethane.*

*27. An insole according to claim 24, wherein said foam comprises vinyl chloride.*

*28. An insole according to claim 24, wherein said insole comprises a backing material.*

*29. An insole according to claim 28, wherein said backing material is impregnated with said foam.*

*30. An effective foot-deodorizing insole, said insole being shaped to conform to the basic outline of a foot, adapted for insertion into a shoe and having interstitial spaces therein allowing for the passage of air therethrough, said insole comprising:*

*a. an open-celled foam through the open cells of which air can pass; and*

*b. from at least about 10.2 percent to about 35 percent finely ground activated charcoal for deodorizing, said charcoal being homogeneously dispersed throughout the material comprising said foam.*

*31. An insole according to claim 30, wherein said foam comprises latex.*

*32. An insole according to claim 30, wherein said foam comprises polyurethane.*

*33. An insole according to claim 30, wherein said foam comprises vinyl chloride.*

*34. An effective foot-deodorizing insole, said insole being shaped to conform to the basic outline of a foot, adapted for insertion into a shoe and having interstitial spaces therein allowing for the passage of air therethrough, said insole comprising:*

*a. an open-celled foam through the open cells of which air can pass;*

*b. from at least about 10.2 percent to about 35 percent finely ground activated charcoal for deodorizing, said charcoal being homogeneously dispersed throughout the material comprising said foam; and*

*c. a backing material.*

*35. An insole according to claim 34, wherein said backing material is impregnated with said foam.*

*36. An effective foot-deodorizing insole, said insole being shaped to conform to the basic outline of a foot, adapted for insertion into a shoe and having interstitial spaces therein allowing for the passage of air therethrough, said insole comprising:*

*a. an open-celled foam, comprising at least one member of the group consisting of latex and polyurethane foams, through the open cells of which air can pass;*

*b. at least about 10.2 percent finely ground activated charcoal for deodorizing, said charcoal being homogeneously dispersed throughout the material comprising said foam; and*

*c. a backing material.*

*37. An effective foot-deodorizing insole, said insole being shaped to conform to the basic outline of a foot, adapted for insertion into a shoe and having interstitial spaces therein allowing for the passage of air therethrough, said insole comprising:*

*a. an open-celled latex foam through the open cells of which air can pass;*

*b. at least about 10.2 percent finely ground activated charcoal for deodorizing, said charcoal being homogeneously dispersed throughout the material comprising said foam; and*

*c. a backing material.*

*38. A sheet for absorbing odors resulting from a perspiring portion of a human body comprising a cured sheet of open-celled foam, said foam containing homogeneously distributed through the solid part thereof finely divided activated charcoal particles in an amount effective to absorb odors when said sheet is subjected to contact with body perspiration and to passage of odor-filled air through interstitial spaces within said foam, said charcoal particles having been incorporated prior to frothing and curing of said foam.*

*39. The article of claim 38 wherein the charcoal is present in the amount of about 10.2 to 35 percent.*

*40. The article of claim 38 wherein the other side has a backing layer of a material which is pervious to passage of air, at least the outer surface of said layer being free of finely divided activated charcoal.*

*41. The product of claim 38 wherein said foam is formed of latex.*

*42. The product of claim 40 wherein said material is a textile.*

*43. The product of claim 38 wherein said foam is selected from the group consisting of latex foams, polyurethane foams, and vinyl chloride plastisol foams.*

* * * * *